Oct. 18, 1966  G. R. WOLTER ET AL  3,280,351

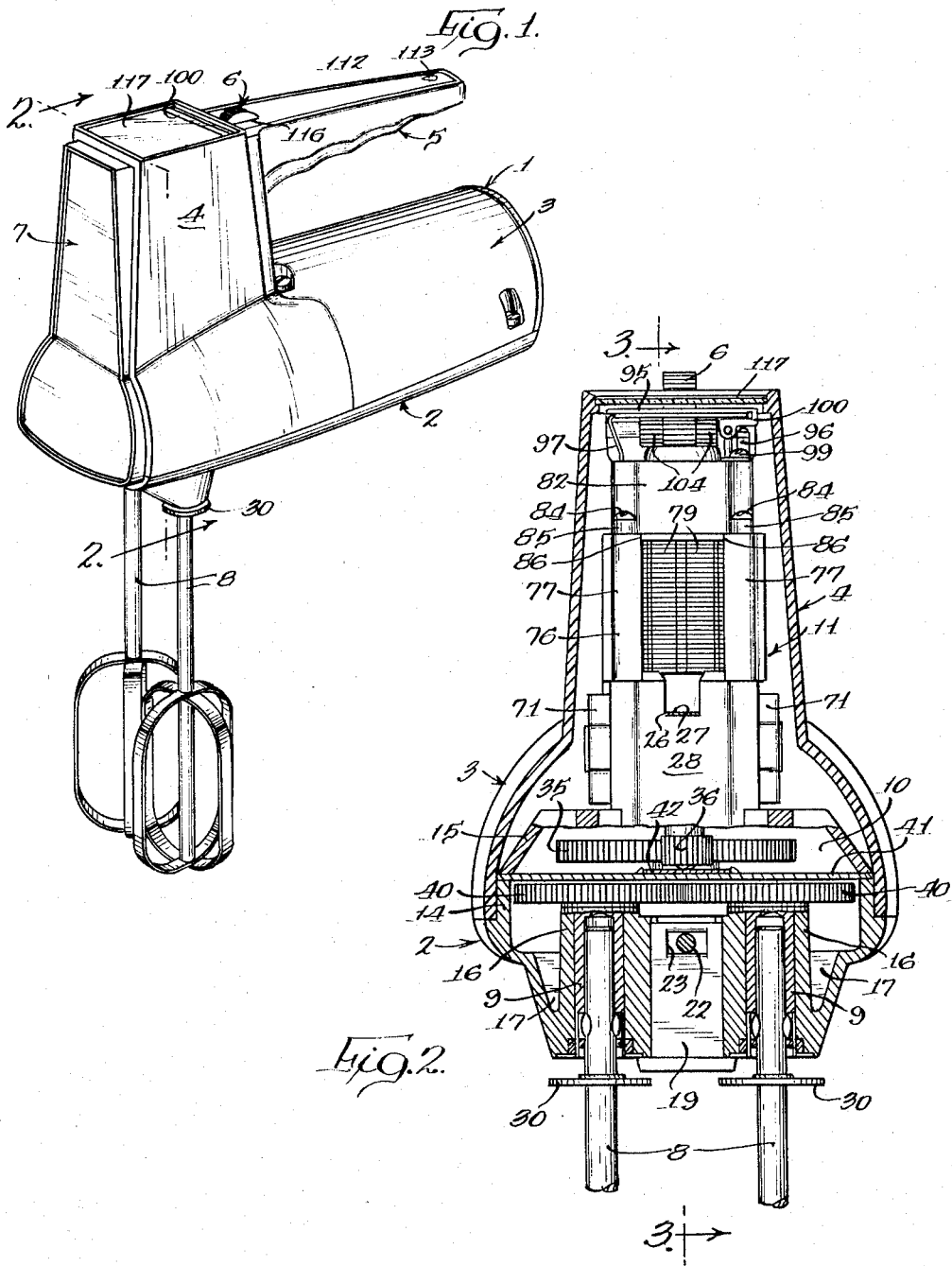

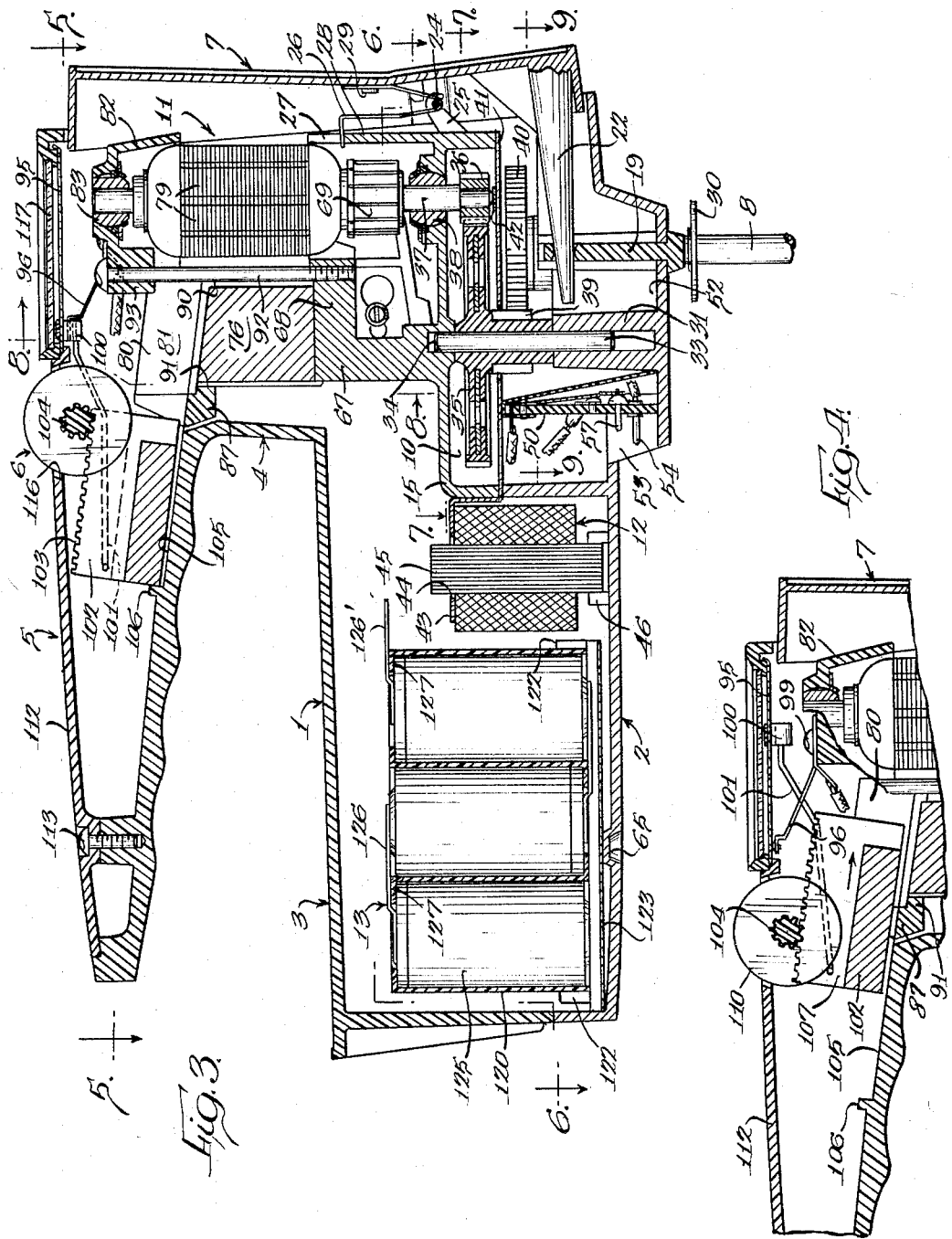

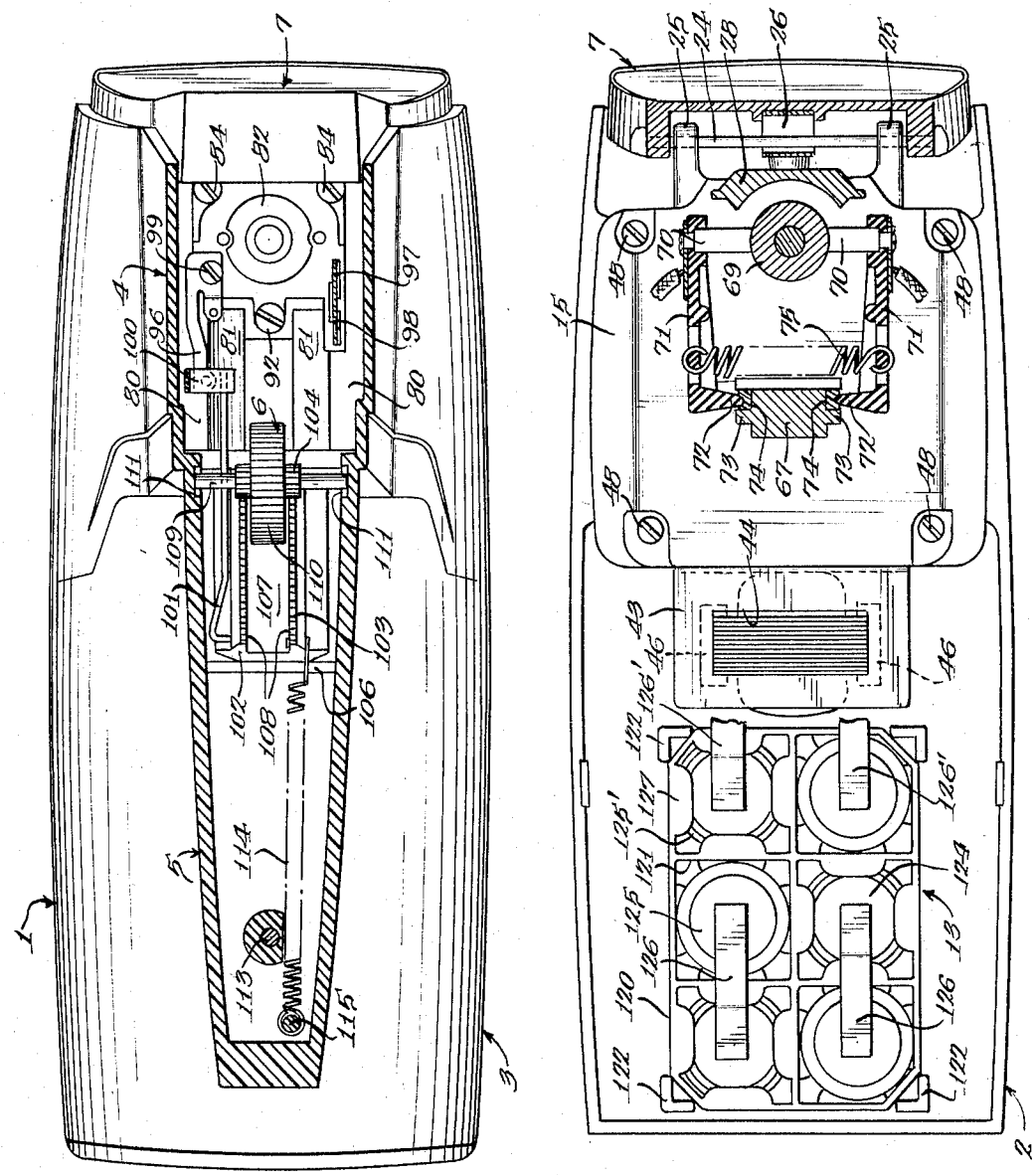

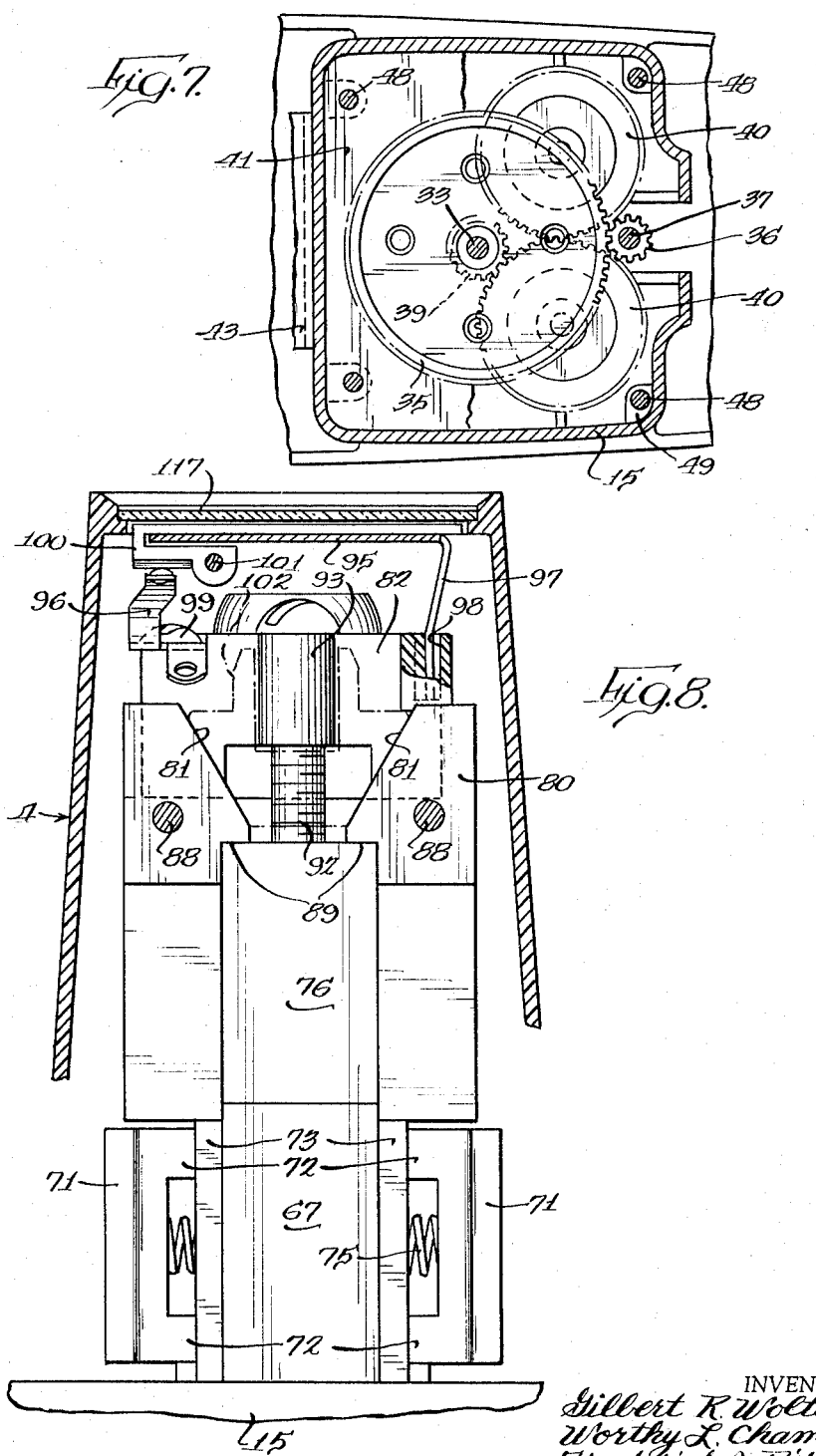

MIXER

Filed Dec. 31, 1962  6 Sheets-Sheet 5

INVENTORS:
Gilbert R. Wolter
Worthy L. Chambers
Frederick J. Ritter
By George R. Clark Atty

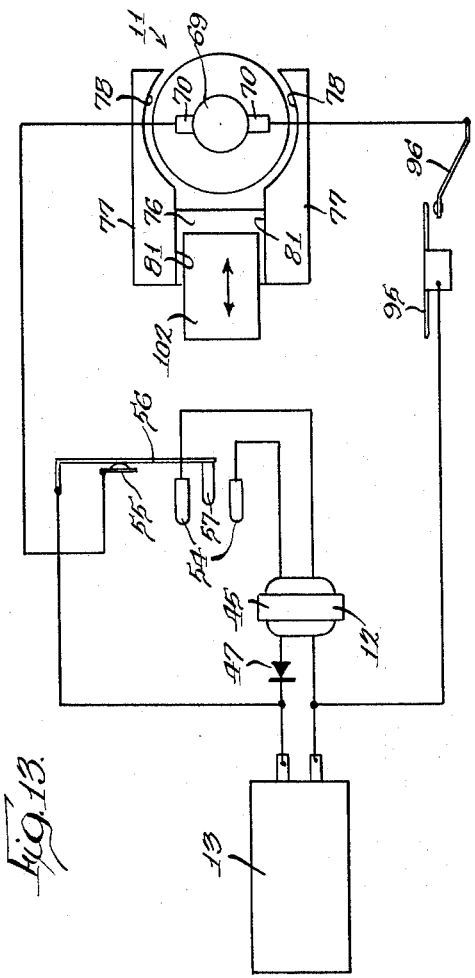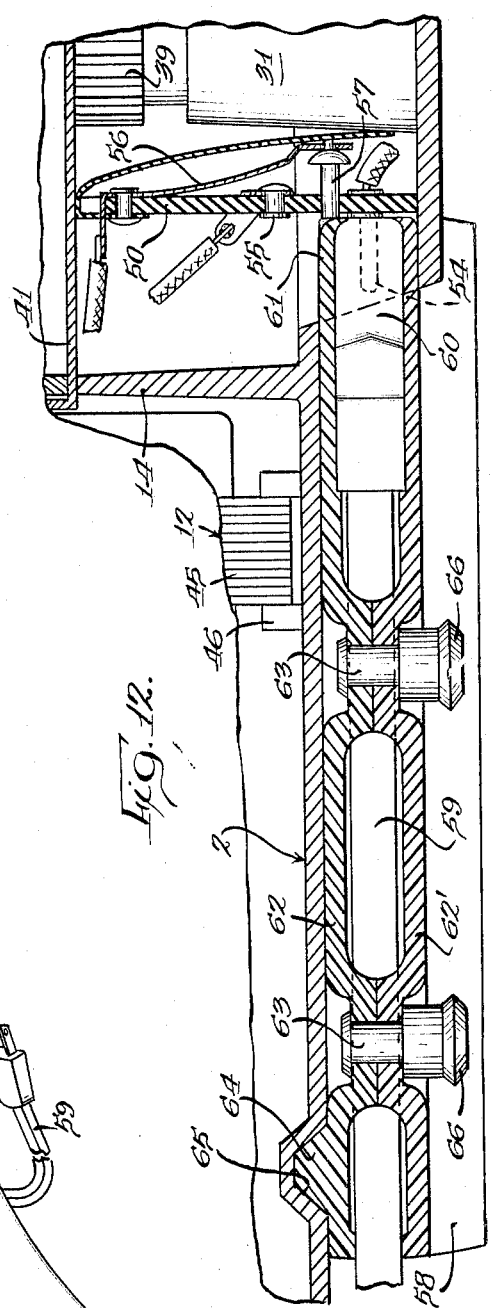

United States Patent Office 3,280,351
Patented Oct. 18, 1966

3,280,351
MIXER
Gilbert R. Wolter, Elmhurst, Worthy L. Chambers, Wilmette, and Frederick J. Ritter, Chicago, Ill., assignors to Sunbeam Corporation, Chicago, Ill., a corporation of Illinois
Filed Dec. 31, 1962, Ser. No. 248,574
5 Claims. (Cl. 310—68)

This invention relates to a mixer, and more particularly, to a battery operated mixing device.

The small portable hand-held type of electric mixer has proven to be very popular with the housewife. One reason for this is the ability to use the mixer in almost any area of the kitchen as long as an electrical wall outlet is available which the connector cord will reach. However, it would clearly be an improvement to develope a mixer which has its own built-in power source. This would not limit the use of the mixer to the availability of a wall socket or the length of the cord. Also, it would be more convenient to use if the mixer did not have a cord hanging from it.

Battery operated appliances are not new per se. However, providing a battery operated mixer has problems which are unique to itself because of its special requirements. For one thing, since it is to be used primarily by the housewife, it must be essentially lightweight, well balanced, and compact. Otherwise, the device is not practical.

In order to provide a battery pack with ample power, it will be appreciated that a sizeable battery system is necessary. However, the conventional small portable hand-held type of mixer which has proved to be so popular does not have any free space in it for receiving the battery pack. This is because the entire casing is almost completely occupied by parts such as the motor, speed reduction gears, and drive spindles, and control means such as the switch, speed control means, and beater ejection mechanism.

Therefore, if a mixer is to be provided with a built-in power source of sufficient power, it is clear that an entirely new mixer must be provided if it is to remain essentially lightweight, well balanced, and compact. This is not dictated solely by providing room for the built-in power source. For example, if the battery pack is going to be rechargeable, it would be preferable to build the recharger and any desired or necessary switch controls into the mixer so that it is a unitary device.

Accordingly, it is an object of this invention to provide an improved mixer, and more particularly, a battery operated mixer.

It is a further object of this invention to provide a mixer having a built-in rechargeable battery pack and recharger which is essentially lightweight, well balanced, and compact.

It is a further object of this invention to provide improvements in mixer elements such as its motor, speed control and beater ejection mechanism or their location which will make it practical to utilize a built-in battery pack in the mixer.

Briefly, in the invention, the casing which is used is preferably generally physically similar to that which has proven to be popular in present day small portable hand-held type electric mixers. That is to say, the casing is generally elongated and a handle extends rearwardlly of the case spaced from its upper surface, and the front end of the casing and handle are interconnected by a generally upright handle post. In the prior art, the beater spindles and speed reduction gears were located at the front end of the casing and the motor occupied the remaining portion of the casing and in some mixers the controls such as the switch, speed selector means, and beater ejection mechanism might have been located in the handle post if it were hollow. In the invention an improved motor, speed reduction gears, switch and speed selector means and beater ejection mechanism are provided. For example, the motor is a D.C. motor utilizing a permanent magnet field and the speed selector means comprises a stepless control which gives an infinite speed range control with smooth transition from one speed to another. The stepless control comprises a magnetic shunt for the permanent magnet field which is easy to operate and requires a relatively small number of parts and does not have the disadvantages of prior art speed controls such as arcing and contact erosion. Additionally, the D.C. motor is small and compact and adapted to be located in the handle post which is hollow. This makes it possible to locate the battery pack in that portion of the casing formerly occupied by the motor without significantly increasing the size of the casing and the device is well balanced since the weight of the motor and battery counteract each other because of their locations. The motor is supported on the gear chamber and the bottom of the hollow handle post is open to provide communication between the hollow handle post and the interior of the casing. This makes it possible to utilize a base plate mounting for the drive spindles, gear chamber, motor and battery pack and then merely enclose these parts with a cover member having the handle and its post connected thereto while inserting the motor into the hollow post through the bottom open end thereof. Further improvements comprise mounting the beater ejection mechanism at the front end of the mixer off the gear chamber, with the beater ejection manual operator comprising essentially a single piece pivoted plate member which serves as a closure member for the open front end of the casing and the corresponding open side of the hollow handle post. The handle is made hollow and its front end opens into the upper end of the hollow post so that the speed selector means can be mounted in the handle for cooperation with the D.C. motor located in the adjacent handle post. The motor has its armature located to rotate on an axis generally perpendicular to the length of the casing and the same is true of the drive spindles and speed reduction gears. This makes it possible to use an all spur gear drive between the armature shaft and the spindles as contrasted to the worm gear drive of the prior art which is less efficient.

The features of the invention which are believed to be novel are set forth with particularity in the appended claims. The invention itself, however, both as to its organization and operation, together with further objects and advantages thereof, may best be understood by reference to the following description taken in connection with the accompanying drawings, in which:

FIG. 1 is a perspective view of a battery operated mixer;

FIG. 2 is an enlarged sectional view taken along the section line 2—2 of FIG. 1;

FIG. 3 is a sectional view taken along the section line 3—3 of FIG. 2;

FIG. 4 is a sectional view similar to that of the upper part of FIG. 3 except with the switch being shown in closed position and the speed selector controls at a different speed setting;

FIG. 5 is a sectional view taken along the section line 5—5 of FIG. 3;

FIG. 6 is a sectional view taken along the section line 6—6 of FIG. 3;

FIG. 7 is a sectional view taken along the section line 7—7 of FIG. 3;

FIG. 8 is an enlarged sectional view taken along the section line 8—8 of FIG. 3;

FIG. 11 is a perspective view of a mounting bracket which is adapted to connect an electrical extension cord to the mixer for recharging the batteries;

FIG. 12 is an enlarged sectional view similar to that of the bottom part of FIG. 3 showing the mounting bracket in position with the disconnect switch moved to motor disconnect position; and FIG. 13 is a diagrammatic illustration of the electric circuit connections of the battery operated mixer.

Figure 9:
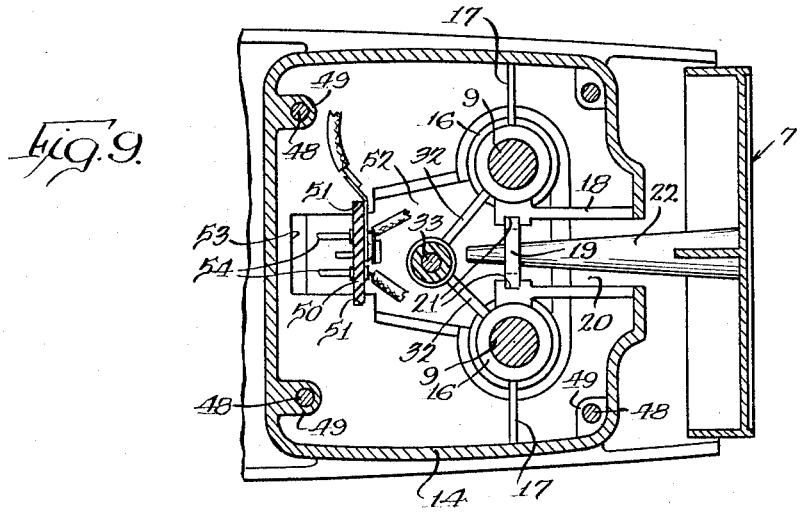
FIG. 9 is a sectional view taken along the section line 9—9 of FIG. 3.

Referring now particularly to FIGS. 1–3, illustrated therein is a small portable hand-held type battery operated mixer having a casing 1 which is generally elongated. The casing 1 comprises a base member 2 which may be an aluminum die casting for light weight, and a cover member 3 which may be a lightweight molded plastic member. At its front end the casing 1 is provided with a hollow post 4 which can be integrally formed with the cover member 3. A hollow handle 5 is provided for the mixer. Handle 5 may be integrally formed with the hollow post 4. The handle 5 is provided with a thumb operated actuator 6 for controlling an on-off switch and speed selector control means in a manner to be more particularly described hereinafter. The front end of casing 1 is open and the same is true of the corresponding front side of the hollow post 4. These open portions of casing 1 and post 4 are closed by a beater ejection operator plate 7 in a manner which will be described in detail hereinafter. The casing 1 and handle 5 extend generally parallel to each other in spaced relationship, and are connected to each other at their forward ends by the post 4 which extends generally perpendicular to the casing 1 and handle 5. A pair of beater shafts 8 are adapted to be inserted into a pair of hollow rotary drive spindles 9 located in the base member 2. The rotational axes of the shafts 8 and spindles 9 are disposed generally perpendicular to the length of casing 1 and the shafts 8 extend out from beneath the base member 2.

Referring now more particularly to FIG. 3, a gear chamber 10 is formed on the base member 2 at the front portion of the mixer. A motor indicated generally by reference numeral 11 is mounted above the gear chamber 10 and positioned in the hollow post 4. Disposed behind the gear chamber 10 on the base member 2 is a recharger indicated generally by reference numeral 12. A battery pack indicated generally by reference numeral 13 is located on base member 2 behind the recharger 12 and in generally the back half of the mixer casing 1.

By referring to FIGS. 2 and 9, it will be seen that the gear chamber 10 is defined by walls 14 which are integrally formed on the base member 2. The gear chamber 10 is closed by a gear chamber cover 15. The spindles 9 are mounted in bearing bushings 16 which are also integrally formed with the base member 2 and project into the gear chamber 10. The bearing bushings 16 and walls 14 are strengthened by ribs 17 and 18 extending therebetween. The pair of ribs 18 which are oriented lengthwise of the casing are spaced with respect to each other to provide an access channel 20 to a beater ejector 19. The beater ejector 19 is located in the rear of access channel 20 and is guided for up and down movement in a pair of guideways 21 formed in the spaced spindle bearing bushings 16. A rearwardly extending finger 22 formed on the bottom of plate 7 enters an aperture 23 formed in the upper end of ejector member 19. Referring also to FIG. 6, a horizontally disposed pivot pin 24 is connected to plate 7 adjacent the gear chamber cover 15. The gear chamber cover 15 has a pair of integrally formed downwardly facing trunnions 25 to receive the pivot pin 24. The pivot pin 24 is retained in the trunnions 25 by a spring 26 to thereby pivotally retain plate 7 in position. The left-hand end of spring 26 hooks into a slot 27 formed in an integral upright 28 of gear chamber cover 15. The righthand end of the spring 26 is connected to the manually operable ejector plate 7 by a boss 29 or the like formed on the inside surface of member 7 which enters a not shown slot formed in spring 26. The spring 26 is generally U-shaped and biases the member 7 in a pivotally clockwise direction about the pivot pin 24 and trunnions 25. When the upper end of member 7 is depressed in the manner indicated in FIG. 10, the finger 22 moves downwardly to thrust the member 19 in a down direction. The member 19 extends through the base member 2 contiguous to a pair of shoulders 30 formed on the beater shafts 8. When the member 19 strikes the shoulders 30, the beater shafts will be ejected from within the spindles 9 in a manner well known to those skilled in the art. When the upper end of plate 7 is released the spring 26 will bias it back to the position indicated in FIG. 3. Thus, the plate 7 which is a manually operable ejector is provided with slight pivotal movement but it also serves as a cover for the front open end of casing 1 and post 4. That is to say, in both of the FIG. 3 and FIG. 10 positions of plate 7, the front end of casing 1 and post 4 is closed by cover 7.

Still referring to FIG. 3, a hollow boss 31 is formed on the base 2 behind the ejector member 19. A pair of integral ribs 32, see FIG. 9, interconnect the boss 31 and spindle bearing bushings 16. A shaft or pin 33 is fixed in the boss 31 and is supported at its upper end in a bearing opening 34 formed in the gear chamber cover 15. A large spur gear 35 is rotatably mounted on the pin 33. This large spur gear 35 is driven by a small spur gear 36 mounted on the lower end of the armature shaft 37 of the motor 11. The armature shaft 37 extends through a bearing 38 mounted in the gear chamber cover 15. Formed on the hub of the large spur gear 35 is a small spur gear 39 which meshes with one of a pair of spur gears 40 connected to the beater shaft drive spindles 9. Since the axis of rotation of the armature shaft 37 is parallel to that of the axes of rotation of the spindles 9 it is possible to use spur gears throughout the entire speed reduction gear assembly between the armature shaft 37 and the spindles 9. In prior art mixers, since the motor is conventionally positioned in that part of the casing 1 now occupied by the recharger 12 and battery pack 13, the armature shaft extended perpendicular to the spindles. This necessitated the use of a worm gear on the end of the armature shaft to drive the spindle gears. The all spur gear assembly of the instant invention is more efficient than the worm gear arrangement of the prior art, and additionally, in the invention the gears 35, 39 and 40 are preferably nylon gears which have self-lubricating qualities and are quieter in operation than metallic gears. Since the nylon gears are self-lubricating, it is not necessary to pack any grease in the gear chamber 10. Helical gears can be used instead of spur gears, which are still more efficient than the worm gear arrangement of the prior art. High efficiency in the gears is desired so as to get maximum use of the power available from the batteries.

Referring now to FIG. 6 as well as FIG. 3, a plate 41 is disposed across the gear chamber 10 between the walls 14 and the gear chamber cover 15. This plate 41 has several functions. At its forward portion the plate 41 is provided with a bearing pad 42 which serves as an end thrust bearing for the lower end of armature shaft 37. The central portion of plate 41 is apertured so that the small spur gear 39 can extend therethrough. The rear part of plate 41 has a tab 43 formed thereon which has a slot 44. The tab 43 extends over the recharger 12 to hold it in place on the base member 2. The recharger 12 comprises a transformer 45 having a core, and the upper end of core extends into the slot 44. The lower end of the transformer core is positioned on the base member 2 by protuberances 46 integrally formed thereon. Referring also to FIG. 13, the recharger 12 comprises a step down transformer 45 having not shown primary and secondary windings. A half-wave silicone diode rectifier 47 is positioned in the leads of the not shown secondary winding to rectify A.C. current into D.C. current for recharging the battery pack 13.

The plate 41 and gear chamber cover 15 are held in place by screws or the like 48, see FIG. 6, which extend therethrough into tapped bosses 49, see FIG. 9, integrally formed on the base member 2. The plate 41 has another function in addition to that of providing an end thrust bearing for the armature shaft 37 and clamping means for the recharger 12. As seen in FIG. 3, a disconnect switch mounted on a switch plate 50 is positioned behind the boss 31. The switch plate 50 is supported on the base member 2 in guide slots 51, see FIG. 9, formed therein. The switch plate 50 is retained in slots 51 bottomed against the base member 2 by virtue of the fact that the plate 41 bears against the upper edge of switch plate 50.

The spindle bearing bushings 16, the boss 31, and the switch plate 50 are actually positioned in a well or recess 52 formed in the base member 2 beneath the gear chamber 10. This well 52 has an opening 53 formed at its rear end so that a connector cord can be connected to the disconnect switch mounted on plate 50 for recharging the battery pack 13. The disconnect switch comprises a pair of prong contacts 54 which are adapted to be received in the socket plug of an electrical extension cord connected to an A.C. wall outlet or the like. Also mounted on plate 50 are a fixed contact 55 and a movable contact blade 56, see FIG. 12. An insulating plunger 57 is mounted in plate 50 beneath the lower end of contact blade 56. When the socket plug of a connector cord is inserted into opening 53 for engagement with the contact pins 54, this connects the source of A.C. voltage with the recharger 12 to recharge the battery pack 13. However, as the socket plug enters the opening 53, it strikes the plunger 57 and moves it in a right-hand direction to flex the switch contact blade 56 off the fixed contact 55. Separation of contacts 55 and 56 causes disconnection of the motor 11 from the battery pack 13 during the process of recharging the battery pack. It is desired to disconnect the motor from the battery pack when recharging since the rate of recharge is less than the rate of power utilization by the motor.

In FIG. 12 the combination mounting bracket 58 and connector cord 59 is illustrated in proper position for recharging the battery pack. The socket connector 60 of the cord 59 extends into a nose portion 61 formed on member 58 on the upper end thereof when viewing FIG. 11. When nose portion 61 is inserted into opening 53, the nose 61 strikes the insulating plunger 57 to lift the switch contact blade 56 off the fixed contact 55. The mounting bracket 58 comprises a pair of insulating members 62, 62' which are positioned against each other. The cord 59 extends between the members 62, 62' and the members 62, 62' are retained together by rivets or the like 63. The outer surface of member 62 has a slight concave curvature to match the convex curvature of the exterior surface of base member 2. Additionally, members 62 and 2 have a matching protuberance and recess 64 and 65, respectively. Thus entry of the nose 61 into recess 53 and protuberance 64 into recess 65 serves to fix the mounting bracket 58 with respect to the mixer. The rivets or the like 63 have collars or the like connected thereto with enlarged heads 66. The enlarged heads extend above the outer surface of the member 62'. The enlarged heads 66 are adapted to be received in the apertures of a not shown wall mounted metallic bracket or the like for suspending the mixer on a wall adjacent a wall outlet for recharging the battery pack.

In the preferred form of the invention, sufficient space is provided between members 62, 62' to provide a cord storage chamber for cord 59. That is to say, after the bracket is mounted on a wall adjacent a wall outlet and the cord 59 is plugged into the wall outlet, the excess cord is forced into the space between members 62, 62'. The bracket 58 can be left in this position for receiving the mixer after each use to bring the battery pack back to full charge. Since the socket 60 or nose portion 61 will operate the disconnect switch 55, 56 open, there is no danger of running the battery pack down should an on-off switch 95, 96 (to be described hereinafter) be accidentally left in the on position.

The details of the motor 11 and its mounting on the gear chamber cover 15 will now be described. It was previously noted in connection with the description of the beater ejection mechanism that the gear chamber cover 15 has an integrally formed forward upright portion 28 which is notched at its upper end to receive the upper left-hand end of the spring 27. Also integrally formed with the gear chamber cover 15 is a rear upright portion 67. The two uprights 67 and 28 are interconnected at their upper ends by a cross member 68 which is annular at its forward portion so that the commutator 69 of the armature can be inserted therethrough to between a pair of commutator brushes 70, see FIG. 6. The integral portions 28, 67 and 68 provide means for mounting the electric motor on the gear chamber cover. The brushes 70 are mounted in a pair of pivotal brush carriers 71. The brushes 70 are located at the forward ends of the carriers 71, and at their rear ends the carriers 71 have pivot lugs 72 formed thereon. The opposite sides of the upright 67 are provided with a pair of parallel spaced ridges 73, see FIG. 6, which define grooves therebetween. Positioned in the grooves defined between the ridges 73 are nylon or the like bearing strips 74 to insure a minimum of pivotal resistance for the brush carriers. The two carriers are interconnected by a spring 75 which is positioned beneath the part 68 in front of the upright 67. The spring 75 pivotally biases the carriers 71 with their brushes 70 toward the commutator 69. When it is desired to inspect the condition of the brushes 70, it is only necessary to grasp the rear ends of the carriers 71 and rotate them in a rearward direction against their spring bias.

Figure 10:
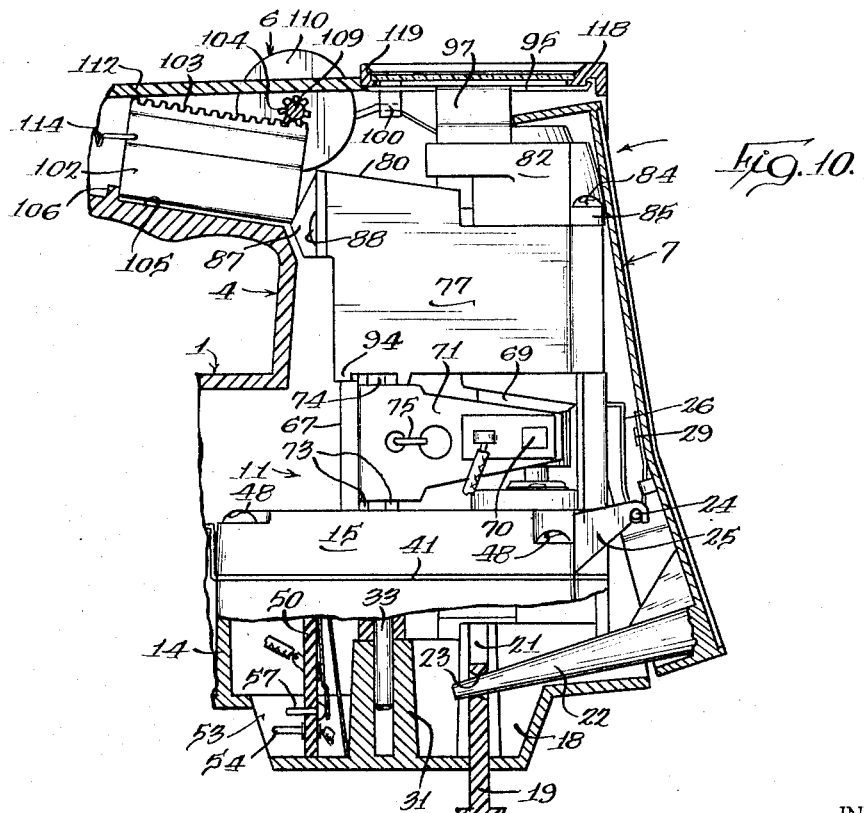
FIG. 10 is a view similar to that of FIG. 3 except with the beater ejection mechanism being shown in its beater ejecting position.

The field structure of the motor 11 comprises a permanent magnet 76 having magnetic flux conducting pole pieces 77, see FIG. 10, which terminate at their right-hand ends in main pole faces 78, see FIG. 13, disposed on opposite sides of the armature of the motor 11. The armature has pole faces 79 formed thereon which have not shown electrical windings which are connected to the commutator 69. At the left-hand ends of the pole pieces 77, a pair of secondary pole faces 80 are formed which extend above the permanent magnet 76 and provide a pair of magnetic shunt pole faces 81 for controlling the speed of the armature in a manner to be described hereinafter. In normal operation the magnetic flux of the permanent magnet 76 travels through the pole pieces 77 and across the gap defined between the primary pole faces 78. The battery pack 13 is connected to the brushes 70 and by virtue of the commutator 69 energizes the windings of the armature pole pieces 79 to cause rotation of the armature by magnetic reaction between the pole faces 78 and 79.

Positioned on the pole pieces 77 is a generally bell-shaped plastic end member 82. A bearing 83 is positioned in the member 82 for the upper end of armature shaft 37. The member 82 also provides support for the on-off switch of the mixer in a manner to be described hereinafter. The member 82 clamps the two pole pieces 77 together at their forward ends by a pair of screws or the like 84 extending through lugs 85 formed on member 82 and into each of the pole pieces 77. The bottom edge of the bell-shaped member 82 and the upper edges of the pole faces 78 have cooperative shoulders 86, see FIG. 2, formed thereon to insure proper spacing of the pole faces 78. The rear ends of the pole pieces 77 are held tightly against the opposite sides of the permanent magnet 76 by magnetic attraction. Additionally a plastic member 87 which is generally U-shaped spans the secondary pole pieces 80 and is connected thereto by screws or the like 88.

The permanent magnet 76 seats on the part 68 which, of course, is constructed from aluminum or other non-magnetic flux conducting material. The top of the permanent mangnet 76 is seated in grooves or shoulders 89, see FIG. 8, formed on the shunt pole faces 80. The front of the magnet is positioned by shoulders 90, see FIG. 3, formed on the pole pieces 77, and the rear portion of magnet 76 is properly positioned by a lug 91 formed on the plastic piece 87. The bottom edges of the pole faces 78 and the upper edge of the annular portion of part 68 may have cooperative shoulders formed thereon similar to those indicated by reference numeral 86 formed between the upper ends of the pole faces 78 and the bottom edge of the bell-shaped member 82. In this manner, the D.C. motor is correctly located on the gear chamber cover 15 with all its parts in proper alignment and then the motor is firmly clamped to the part 68 by a stud 92 which extends from a lug 93 formed on the rear of bell-shaped member 82 into a tapped opening formed on the part 68. The rear lower left-hand corners of the pole pieces 77 have lugs 94 formed thereon, see FIG. 10, which engage the ridges 73 to prevent the field structure from twisting or rotating with respect to the mounting portions of the gear chamber cover for the motor. After the motor 11 is assembled on the gear chamber cover 15, it can be inserted into the hollow post 4 of the mixer cover 3 since post 4 opens at its bottom end into the interior of the mixer housing defined by members 2 and 3. The cover 3 is secured to the base member 2 by screws or the like illustrated in the top of cover 3.

Referring to FIGS. 2–5 and 8, the on-off switch and speed selector control means will now be described. The on-off switch comprises a fixed contact plate 95 and a movable contact arm 96. Both of these elements are mounted on the top of motor 11 on the plastic bell-shaped member 82. The fixed contact plate 95 is flat and on its right-hand side when viewed from FIG. 8 is provided with an integral support tab 97. Tab 97 enters a slot 98 formed on the right-hand side of member 82 when viewing FIG. 8. The movable switch contact arm 96 is supported on the left-hand side of member 82 when viewing FIG. 8 by a screw or the like 99. The contacts 95 and 96 are controlled by a member designated generally by reference numeral 100. The member 100 comprises a strip which extends laterally across the upper surface of member 95, and at its left-hand end when viewing FIG. 8 it is formed with a U-shaped portion so as to embrace the left-hand edge of member 95. In FIGS. 3 and 8, the contacts 95 and 96 are illustrated in open position inasmuch as the member 100 has been moved rearwardly to place its lower portion between the contacts 95 and 96 by depressing contact 96. In FIG. 4 the switch is shown in closed position inasmuch as member 100 has been moved forwardly to permit the contact 96 which is a resilient spring contact arm to move upwardly against contact plate 95.

The member 100 is moved back and forth by a rod 101 connected thereto and extending in a rearward direction for connection to a mass or block of magnetic flux conductive material indicated generally by reference numeral 102. The block 102 has a gear rack 103 formed thereon which is engaged by a gear 104. When the gear 104 is rotated in a counterclockwise direction, this causes forward movement of the block 102 and the rod 101 connected thereto so that the member 100 moves away from the movable switch contact arm 96 to close the on-off switch as illustrated in FIG. 4. When gear 104 is rotated in a clockwise direction, the opposite will happen. That is to say, block 102 and rod 101 and member 100 are moved rearwardly so that member 100 engages contact 96 to depress it for separation from the contact 95.

The block 102 and the secondary pole faces 81 together comprise the magnetic shunt means for regulating the speed of the armature. When the block 102 is disposed between the pole faces 81 the magnetic flux of the permanent magnet 76 is shunted away from the main pole faces 78. This causes the armature to increase in speed. Varying the degree of overlap or shunt between the block 102 and pole faces 81 varies the speed of the armature. That is to say, increasing the overlap or shunting increases the speed, and reducing the overlap or shunting reduces the speed. The upper surface of permanent magnet 76 is sloped downwardly slightly in a forward direction. The pole faces 81 are also inclined downwardly in a forward direction and slope away from each other as indicated best in FIG. 8. The plastic member 87 which is generally U-shaped is flat on its bottom and its sides diverge away from each other at the same angle as the pole faces 81 so as to form a guide trough for the block 102. The block 102, as best seen in FIG. 5, is also flat on its bottom and has side surfaces which are similarly sloped away from each other so that the bottom and side surfaces of block 102 match the guide trough provided by member 87. The function of shunt guide 87 is to allow shunt 102 to be completely withdrawn from pole faces 81 but to maintain alignment of shunt 102 and pole faces 81 for re-engagement of shunt 102 with pole faces 81. A guide trough 105 is also formed in the bottom surface of handle 5 adjacent member 87. By viewing FIG. 3, it will be seen that rearward movement of block 102 is limited by an integral stop 106 formed at the rear end of trough 105, and in this position of the block 102 its front end will rest in the trough provided by member 87. Since the block 102 is constructed from metallic magnetic flux conductive material the member 87 is preferably constructed from plastic so that these two parts will easily slide with respect to each other instead of galling on each other.

Referring particularly to FIG. 5, the block 102 has a slot 107 defined therein by a pair of spaced parallel upstanding ridges or the like 108. The gear rack 103 is formed on the upper edges of ridges 108. There are two opposite and aligned gears 104, and they are preferably integrally formed with a pin 109 and thumb operated wheel 110. The pin 109 is supported at its opposite ends in bearing surfaces 111 formed in opposite sides of handle 5. When the pin 109 is seated in surfaces 111, the gears 104 are in engagement with the rack gears 103 and the bottom portion of wheel 110 is positioned in the groove 107. The parts are maintained in this position by a cover 112 for closing the upper open surface of hollow handle 5. Cover 112 is secured in position by a screw or the like 113. The cover 112 closes the grooves 111 to retain the pin 109 therein. The block 102 is urged in a rearward direction by a spring 114 to balance the magnetic attraction between magnet 76 and block 102. The spring 114 extends from one of the ridges 108 to a boss or the like 115 formed in the bottom surface of hollow handle 5. The rear of rod 101 is connected to the other ridge 108. The forward end of cover 112 has a slot 116 formed therein and the upper part of the thumb wheel 110 is exposed therethrough so the wheel 110 can be conveniently operated by the thumb of the same hand which is gripping the mixer handle 5.

The top of the post 4 is provided with a window opening which is closed by a dial scale member 117. The window opening is defined by the upper edges of the sides of post 4, see FIG. 8, and front and rear cross pieces 118 and 119, respectively, see FIG. 10, interconnecting the side walls of post 4. The parts 95, 100 and 117 are given suitable contrasting colors so that not shown speed markings formed on dial scale 117 can be easily read.

For example, the upper surface of part 95 can be colored black, the upper surface of part 100 can be colored fluorescent red, and the part 117 can be made opaque with transparent dial markings on a white opaque background.

Referring now to FIGS. 3 and 6, the battery pack 13 will now be described. The pack comprises six 1.25 volt nickel cadmium rechargeable battery cells connected in series. A container 120 is provided for holding the six battery cells in a unitary battery pack. The container is divided into six compartments by cross walls 121 which are preferably integrally formed with the container walls. The container is constructed from molded insulating material and rests on the base member 2. It is positioned thereon by integral lugs 122 and an insulating sheet 123 underlies the container. Each compartment receives its battery snugly and each battery has a central electrode 124 and an outer metallic case 125 which constitutes its other electrode of opposite polarity. These electrodes, of course, are insulated from each other. Adjacent batteries are reversed with respect to each other and then are connected alternately at top and bottom by welded or the like conducting strips 126, 126', the strips 126' constituting the terminals of the series connected batteries. Adjacent compartments are provided with integral insulating tabs 127 at the edges of the cross walls 121 alternately at top and bottom. This is for the purpose of aiding in the retention of the batteries in their respective compartments. Additionally, however, it will be seen that the tabs 127 are disposed between the upper lip or edge 125' of cases 125 and the conducting strip attached to the central electrode 124 at that end of the battery. This is for the purpose of avoiding short circuiting the battery. That is, for the purpose of insulating the strips 126 or 126' connected to a central electrode 124 from the adjacent portion of the case 125 or its lip 125' which comprises the electrode of opposite polarity. The strips 126 besides serving as conducting strips between batteries also aid in retaining the cells in their compartments so that together with tabs 127 the pack and its components are self-retaining.

Referring now to FIG. 13, when the switch contacts 95, 96 are closed, current will flow from battery pack 13 through these contacts and closed switch contacts 55, 56 to the brushes 70 to energize the not shown electrical windings of the armature. The interaction of the magnetic flux thus established in the armature and the magnetic flux established at the pole faces 78 by the permanent magnet 76 results in rotation of the armtaure. Moving the magnetic shunt block 102 towards and away from the magnetic shunt pole faces 81 adjusts the speed of the armature. Opening the switch contacts 95, 96, of course, stops the mixer. When it is desired to recharge the battery pack 13, a connector cord from an A.C. wall outlet is connected to the contacts 54. The socket plug of the electrical cord will strike the insulating button 57 so as to move the contact switch arm 56 away from the fixed contact 55. Opening of contacts 55, 56 results in disconnecting the motor from the battery pack 13. The recharger comprising step down transformer 45 and half-wave rectifier 47 steps down the A.C. voltage and the output current of the secondary of the transformer is rectified by the rectifier 47 to charge the battery pack 13. After the battery pack 13 has been recharged, the extension cord is withdrawn from the contacts 54. This results in the reclosure of the switch contacts 55, 56 so that the mixer can be again operated by reclosing the switch contacts 95, 96.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. A mixing device comprising a hollow casing, said casing having forward and rear ends and bottom and upper sides, a hollow post connected to said upper side adjacent said forward end, a handle connected to said post and extending rearwardly of said casing in spaced relationship with respect to said upper side, at least one rotary spindle mounted in said bottom side adjacent said forward end, the axis of rotation of said spindle being generally perpendicular to the length of said casing, a motor for driving said spindle, said motor being disposed in said hollow post, said motor being aligned lengthwise of said hollow post, said motor comprising a D.C. motor having a permanent magnetic field, at least one battery in said casing adjacent the rear end thereof for driving said motor, and speed control means for said motor, said speed control means comprising a movable shunt for the flux of said permanent magnet field.

2. In a mixing device as in claim 1, wherein said handle is hollow, said movable shunt being located in said hollow handle, and means on said handle and operable by thumb pressure for moving said shunt towards and away from said permanent magnetic field.

3. A battery operated mixer comprising a casing having a handle connected thereto by a hollow post, a motor positioned in said hollow post, said motor having a field and armature, said armature being disposed between a pair of spaced pole faces of said field, and means for controlling the speed of said motor comprising a movable mass of magnetic flux conductive material for shunting magnetic flux away from said pole faces, said handle being hollow and said mass being disposed therein, and thumb operated means on said handle for moving said mass toward and away from said motor.

4. In a battery operated mixer as in claim 3, wherein said field comprises a permanent magnet, said magnet being disposed between pole pieces connected to said pole faces for magnetically connecting said pole faces to said magnet, and a pair of secondary spaced pole faces connected to said pole pieces, said secondary pole faces being offset from said armature and having guide surfaces formed thereon, and said movable mass comprising a block movable along said guide surfaces to vary the amount of overlap between said block and secondary pole faces.

5. In a battery operated mixer as in claim 4, wherein a guideway is formed in said handle for said block, a gear rack formed on said block, and said thumb operated means comprising a gear wheel in mesh with said gear rack.

References Cited by the Examiner

UNITED STATES PATENTS

| | | | |
|---|---|---|---|
| 2,293,959 | 8/1942 | Wright | 259—1 |
| 2,317,098 | 4/1943 | Gough | 310—66 |
| 2,460,921 | 2/1949 | Candy | 310—190 |
| 2,477,150 | 7/1949 | Synder et al. | |
| 2,552,023 | 5/1951 | Andresen | 310—50 |
| 2,609,525 | 9/1952 | Gemmill | 310—50 |
| 2,663,552 | 12/1953 | Schwaneke | 259—1 |
| 2,670,448 | 2/1954 | Bell et al. | 310—154 |
| 2,857,533 | 10/1958 | Miller | 310—50 |
| 3,027,507 | 3/1962 | Hubner. | |
| 3,089,071 | 5/1963 | Hartwig | 320—2 |
| 3,121,178 | 2/1964 | Seyfried et al. | 310—50 |
| 3,143,697 | 8/1964 | Springer | 320—2 |

FOREIGN PATENTS

| | | |
|---|---|---|
| 481,833 | 3/1952 | Canada. |
| 1,234,049 | 5/1960 | France. |

MILTON O. HIRSHFELD, *Primary Examiner.*

WALTER A. SCHEEL, JOHN F. COUCH, *Examiners.*

W. PRICE, A. J. ROSSI, *Assistant Examiners.*